(12) United States Patent
Serna García-Conde et al.

(10) Patent No.: US 10,773,777 B2
(45) Date of Patent: Sep. 15, 2020

(54) AUXILIARY FLOATING SYSTEM FOR THE INSTALLATION AND/OR TRANSPORT OF OFFSHORE STRUCTURES AND METHOD COMPRISING SAID SYSTEM

(71) Applicant: Esteyco S.A., Madrid (ES)

(72) Inventors: José Salustiano Serna García-Conde, Madrid (ES); Miguel Ángel Fernández Gómez, Madrid (ES)

(73) Assignee: ESTEYCO S.A., Madrid (ES)

( * ) Notice: Subject to any disclaimer, the term of this patent is extended or adjusted under 35 U.S.C. 154(b) by 23 days.

(21) Appl. No.: 16/301,264

(22) PCT Filed: May 12, 2017

(86) PCT No.: PCT/ES2017/070306
§ 371 (c)(1),
(2) Date: Nov. 13, 2018

(87) PCT Pub. No.: WO2017/194813
PCT Pub. Date: Nov. 16, 2017

(65) Prior Publication Data
US 2019/0135385 A1    May 9, 2019

(30) Foreign Application Priority Data

May 13, 2016   (ES) .................................. 201630627

(51) Int. Cl.
*B63B 35/44*         (2006.01)
*F03D 13/25*         (2016.01)

(52) U.S. Cl.
CPC .............. *B63B 35/44* (2013.01); *F03D 13/25* (2016.05); *B63B 2035/446* (2013.01); *Y02E 10/727* (2013.01)

(58) Field of Classification Search
CPC . B63B 35/44; B63B 2035/446; B63B 35/003; B63B 2001/145; B63B 1/14; F03D 13/25; Y02E 10/727
See application file for complete search history.

(56) References Cited

U.S. PATENT DOCUMENTS 9,464,626 B2 *  10/2016  Tolo ......................... B63B 1/107
9,523,355 B2 *  12/2016  Taub ......................... E02B 17/02

FOREIGN PATENT DOCUMENTS

EP    2036815 A1    3/2009
EP    2327874 A2    6/2011
(Continued)

OTHER PUBLICATIONS

International Search Report and Written Opinion received in PCT Application No. PCT/ES2017/070306, dated Jul. 4, 2017.

*Primary Examiner* — Anthony D Wiest
(74) *Attorney, Agent, or Firm* — Knobbe, Martens, Olson & Bear LLP

(57) ABSTRACT

The invention relates to an auxiliary floating system for the installation, transport or maintenance of an offshore structure, said structure comprising at least one essentially vertical shaft, wherein said auxiliary floating system comprises: at least one floating element that remains semi-submerged during the process of installing the offshore structure; at least one coupling structure connected to said floating element; and guide elements secured to the coupling structure and in sliding contact with the shaft. Advantageously, the sliding contact between the auxiliary floating system and the shaft is such that it allows essentially horizontal relative movement between the auxiliary floating system and said shaft, such that during the process of installing the offshore structure, said structure sinks while the auxiliary floating system remains at essentially the same level on the surface.

19 Claims, 9 Drawing Sheets

(56) References Cited

FOREIGN PATENT DOCUMENTS

ES 2286039 T3 12/2007
WO WO 2016/063210 A1 4/2016

* cited by examiner

AUXILIARY FLOATING SYSTEM FOR THE INSTALLATION AND/OR TRANSPORT OF OFFSHORE STRUCTURES AND METHOD COMPRISING SAID SYSTEM

This application is the U.S. National Phase under 35 U.S.C. § 371 of International Application No. PCT/ES2017/070306, filed May 12, 2017, designating the U.S., and published in Spanish as WO 2017/194813 A1 on Nov. 16, 2017, which claims priority to Spanish Patent Application No. P201630627, filed May 13, 2016, the entire contents of which are incorporated herein by reference.

FIELD OF THE INVENTION

The present invention relates to an auxiliary floating system for installing foundations and/or offshore towers, for example for installing concrete telescopic wind turbine towers offshore. The main application sector of the invention is the civil construction industry, especially the assembly of towers and/or foundations, in combination with the renewable or green energy industry, specifically offshore wind energy. The invention can be further applied to transport and/or maintenance operations of offshore structures.

BACKGROUND OF THE INVENTION

In the sector of marine civil construction, the use of auxiliary floating structures or vessels with the aim of carrying out the offshore installation and/or the transport of heavy and/or voluminous structures, for example offshore foundations and wind turbine towers, is known. The large majority of said auxiliary structures consists of large barges or ships with special characteristics intended for these types of operations, the use of which generally entails an extremely high cost, in addition to the fact that they have very little availability, and furthermore they are only able to operate under very specific and favorable weather conditions.

For example, the patent application EP 2597027 A1 describes a system that comprises a floating structure and a working ship, wherein the floating structure comprises a section equipped with a flange so that it can fit in the securing that forms part of said ship. Once the floating structure is connected to the working ship, the installation and maintenance tasks can be carried out. The problem of this invention is that, in addition to the high costs of use and the limited availability of a ship with these characteristics, the floating structure remains fixed by the securing means, making the installation of the same difficult or impossible in certain conditions.

Likewise, the existence of different types of barges with a space intended to accommodate the offshore structure, more specifically the offshore wind turbine tower to be transported and/or installed, is known. The majority of them have a U shape or consist of two parallel structures joined by fixed metal beams, such as that which is described in patent application WO 2010028762 A1. These solutions also have the main problem of the large dimensions thereof and the resulting high costs of the auxiliary floating structures, along with the need for a specific design for each one of them based on the type of wind turbine tower, as is the case, for example, of the barge described in document EP 2905217 A1. Furthermore, these types of solutions are generally associated with elevation or vertical connection elements by means of which the auxiliary floating element supports at least part of the weight of the auxiliary structure. These types of elements, together with the corresponding connection and disconnection processes, reduce the effectiveness and boost the costs of said solutions.

Many of the offshore positioning or transport systems for large structures additionally comprise the use of large extendable vertical metal columns, intended to rest against the sea bed during the installation period, for example the systems described in the patent applications WO 2008071861 A1 and WO 2009153530 A1, which further increases the total cost of said positioning or transport.

On the other hand, the systems described in patent application GB 2501459 A, which are especially designed for the transport and installation of jacket-type offshore platforms, are also known. However, said systems are generally applied to structures that are not self-floating, and therefore they require the use of two auxiliary elements or structures to function, one of them being intended to provide buoyancy to the structure and the other to improve the stability thereof. Likewise, the system described in the aforementioned application comprises a plurality of connection elements (clamps, pre-installed supports, etc.) between the main structure and the auxiliary floating structures, wherein said connection is made in a rigid and secured way, thereby transmitting vertical forces of floating support to the main structure, and as such contributing to the buoyancy thereof. Although this approach is necessary for the transport and installation of non-floating structures (as is the case in GB 2501459 A), it is a drawback for installing self-floating structures, given that it requires the deinstallation or partial removal of the floating system prior to the anchoring of the main structure. This adds complexity and additional steps to the installation methods, thereby affecting working and maintenance times, as well as involving additional costs associated with the same.

Lastly, patent application WO 2014073956 A1 describes a structure for the transport and installation of a fully assembled and erected wind turbine tower, which comprises securing means, an accommodation area and a gate structure. In this case, the auxiliary floating structure is connected and secured to the substructure of the wind turbine. Thus, although the entire assembly can move in a vertical way for the installation and securing of the wind turbine in the definitive position thereof, this solution does not allow for relative movement between the auxiliary floating structure and the wind turbine tower, thereby making the installation operation difficult. Additionally, these types of structures are especially designed for the installation and transport of completely assembled Tension Leg Platform (TLP) wind turbine towers, making the use of them in other types of offshore structures impossible or very difficult.

The present invention is intended to solve the limitations and drawbacks of known systems for the installation and transport of offshore marine structures, by means of a new auxiliary floating system for performing said operations, together with a method associated with said system.

SUMMARY OF THE INVENTION

To overcome the previously described drawbacks of the state of the art, the present invention aims to provide an auxiliary floating system for the installation and transport of offshore structures, such as foundations and/or wind turbine towers, said offshore structures being provisionally or definitively floating, and wherein said system allows the aforementioned transport and installation operations to be optimized.

Said object of the invention is preferably achieved by means of an auxiliary floating system for the installation and/or transport of an offshore marine structure, said offshore structure being of the type that comprises an essentially vertical shaft, wherein said auxiliary floating system comprises:

At least a floating element (with the possibility of two, three, or more of said elements being used).

At least a coupling structure connected to said floating element and configured to couple to the offshore structure around the shaft thereof.

Advantageously, the auxiliary floating system of the invention additionally comprises one or more guide elements secured to said coupling structure that provide one or more sliding contact surfaces with said shaft; wherein said sliding contact between the guide elements and the shaft of the offshore structure is such that:

it allows essentially free relative vertical movement between the auxiliary floating system and the shaft such that, if the offshore structure sinks, the auxiliary floating system remains at essentially the same level on the surface.

it limits and/or prevents other relative movements between the auxiliary floating system and the shaft, both in relative horizontal movement and in the relative rotation during the roll, pitch or yaw.

The sliding contact between the section(s) of the base of the foundation and/or shaft of the offshore structure and the guide elements secured to the coupling structure are key to the system of the invention. This characteristic, which differs from currently known solutions, allows for the relative vertical movement between the offshore structure and the auxiliary floating system, such that it facilitates the installation of the structure in the definitive position thereof. This way, once the assembly has been transported to the its final location, the structure can be anchored by means of the ballasting of the same, without the need to perform connection and disconnection tasks between the auxiliary floating system and the structure itself, thereby highly simplifying the work to be done offshore. Likewise, the use of large anchoring vessels is not necessary, largely reducing the cost of the installation and eliminating the resulting bottleneck.

In a preferred embodiment of the invention, the guide elements of the system have a plan arrangement around the shaft, such that the maximum plan angle formed by any pair of said guide elements and the central axis of the shaft is equal to or less than three radians. This improves the efficiency by limiting the relative horizontal movement and relative rotation between the auxiliary floating system and the offshore structure that is being installed.

In another preferred embodiment of the invention, the guide elements have an elevation arrangement on at least two levels situated at different heights, the difference in level between the highest level and the lowest level of said levels being equal to or greater than 1 m. This improves the capability of the auxiliary floating system to specifically limit the relative rotation of roll or pitch, and the magnitude of the forces that must be transmitted between both structures to such effect is reduced.

In another preferred embodiment of the invention, the auxiliary floating system is applied to offshore structures that have a shaft with a section with an essentially polygonal geometry. More preferably, in said application at least three of said guide elements are in contact with said shaft in the proximity of the vertices of said essentially polygonal geometry. This allows the structure of the shaft to more efficiently resist the forces that the auxiliary floating system transmits to the shaft, by means of the guide elements, during the installation process of the offshore structure.

In another preferred embodiment of the invention, the coupling structure comprises at least a ring that completely surrounds the shaft of the offshore structure. Said ring can be circular or have any other closed, curved or polygonal geometry. The guide elements can be preferably arranged along said ring or rings.

Alternatively or complementarily, the floating elements comprised in the auxiliary floating system as well as the coupling structure can be modular, such that the adding or subtracting of modules allows the dimensions thereof to be adjusted, making it possible for the auxiliary floating system to be applied to a plurality of offshore structures with different characteristics and/or dimensions, minimizing the additional extra costs.

Preferably, the coupling structure comprises a support element (which can possibly also serve as a guide element) on the offshore structure (for example, on the shaft of the tower) and one or more mobile elements that close on said structure. To this end, the mobile elements comprise the entire closing subsystem, or part of the same, which allows the complete structure to close on the offshore structure, carrying out the following steps:

The floating system in a folded configuration is moved in close until the support element makes contact with the offshore structure.

One or more means for maintaining the position are applied (for example, a tugboat or system of cables or winches) such that the contact between the support element and the offshore structure is maintained throughout the coupling process.

The mobile elements of the coupling structure are moved until the same completely surrounds the offshore structure.

The closing element of the coupling structure is actuated, in order to secure the floating system in the folded or coupled configuration thereof.

The floating elements comprised in the auxiliary floating system are preferably able to be ballasted, and as such the depth and/or weight thereof may vary. This characteristic allows the auxiliary floating system to adapt to the needs of the assembly. They can also be compartmentalized, which makes it possible for a differential ballasting of different compartments. Moreover, they can further comprise one or more lower gates on the bases of said elements as a means for adjusting the behavior thereof, and specifically for damping and for the natural frequency of the assembly. A specific level of opening of a gate in the underwater section of the floating elements allows for a controlled passage of water between the inside of said floating elements and the body of water in which they are located. This allows for the level of buoyancy of the assembly to be regulated, as well as for the effective inertia of the floating planes. This way, adjusting the degree of opening of said gates, the behavior of the assembly can easily be varied. For example, opening the gates further reduces the natural rolling period of the assembly, and closing them more increases the same. This allows it to adapt to the conditions of the structure to be transported and/or the metocean conditions, for a more efficient use of the invention. Said gates in the underwater area of the floating elements are preferably used when the floating element has sealed compartments on the inside thereof, such that the gate or gates allow for the flow of water only in part of said compartments.

The present invention allows for a more simple and efficient coupling and uncoupling between the auxiliary floating system and the offshore platform, which is a highly relative aspect in the application thereof to offshore wind turbine towers, given the large number of installations to be carried out. To this end, in another preferred embodiment of the invention, the auxiliary floating system comprises two or more floating elements and the coupling structure is an articulated structure, which connects at least two of said floating elements, and which comprises an opening and/or closing subsystem to facilitate the placement and/or removal of the offshore structure.

Said opening and/or closing subsystem can act by means of different elements known in the state of the art, such as extendable hydraulic arms that connect different parts of the coupling structure or different floating elements. Cables and/or winches may also be used which allow traction to be used in, and/or between, different parts of the coupling structure or on the floating elements thereof. Tugboats may also be used to pull or push different parts of the system for opening or closing the subsystem.

Thanks to said opening and/or closing subsystem, the auxiliary floating system can take on either an unfolded or a closed configuration, with which it can be coupled to the offshore structure, or a folded or open configuration, with which it can be coupled to and/or uncoupled from the offshore structure. Unlike other auxiliary structures, the auxiliary floating system object of the present invention can transport and/or couple in said folded or open configuration once the offshore structure has already been installed in the definitive location thereof, which facilitates operations since said configuration is smaller and more compact. In this sense, the floating elements comprised in said system can comprise one or more fenders to prevent impacts between them during transport in a folded configuration.

In another preferred embodiment of the invention, at least one floating element comprises a submergible hydrodynamic damping plate, said plate being essentially horizontal and flat. Said plates, also sometimes known as heave plates, allow a hydrodynamic brake to be generated which limits and damps the movements of the assembly formed by the offshore structure and the auxiliary floating system. Moreover, they can be used to conveniently adjust the natural periods of the system, by mobilizing added water, for the purpose of preventing or reducing the possible dynamic amplifications related to the closeness of said natural periods to the periods of the acting swell.

In another preferred embodiment of the invention, the floating elements comprise a depth and a freeboard that is equal to or greater than a given length (H), the value of which essentially complies with the equation $H = R \cdot \sin(\alpha')$, (R) being the distance from the center of each floating element to the longitudinal axis of the shaft, and ($\alpha'$) being the maximum angle of inclination of the foundation of the offshore structure allowed or envisaged during the installation and/or transport thereof. This way, it is ensured that throughout the installation process of the offshore structure, no floating element will be completely submerged or completely emerged.

In another preferred embodiment of the invention, the auxiliary floating system comprises elevation means suitable for transporting equipment and/or personnel to or from the offshore structure. Said means can comprise any type of crane, elevating platforms, winches, elevators, lifts and or other elevation systems known in the art. Said means can be used, for example, to collect equipment located on the offshore structure and employees during the installation thereof. Likewise, said means can be used for maintenance and/or service operations for the installed offshore structure or for other equipment it accommodates, such as a wind turbine. Therefore, in said preferred embodiment, the auxiliary floating system is not only used as an auxiliary means for the installation of the offshore structure, but may also be used as an auxiliary means for maintenance operations of said offshore structure and/or equipment that it may accommodate throughout the useful life thereof. Said elevation means are preferably operated when the auxiliary floating system is coupled to the shaft and the offshore structure is already resting against the sea floor, such that the movements of the system are limited, which facilitates the operation. Additionally, the elevation means can provide the great advantage of avoiding the need for large and expensive offshore elevation means or vessels.

Another object of the present invention relates to a method for the installation and/or transport of offshore structures which eliminates the need for using large vessels for the transport and/or installation of foundations and/or offshore wind turbine towers, significantly reducing the high costs of these methods and providing auxiliary structures with smaller dimensions which, in turn, allow for a greater operability of the assembly.

Said object is preferably carried out by means of a method for the installation and/or transport of an offshore marine structure, said offshore structure being of the type that comprises an essentially vertical shaft, which comprises the use of an auxiliary floating system according to any one of the embodiments described in the present document and wherein at least the following steps are carried out in any technically possible order:

the auxiliary floating system is arranged around the offshore structure;

optionally, the assembly formed by the auxiliary floating system and the offshore structure is transported to the final offshore location thereof;

the offshore structure is anchored at its definitive depth; and the auxiliary floating system is removed from the offshore structure;

In a preferred embodiment of the invention the method additionally comprises partially anchoring the offshore structure before completing the transport of the assembly formed by the auxiliary floating system and the offshore structure to the final offshore location thereof.

In another preferred embodiment of the invention, the method is applied to an offshore structure with a telescopic tower and additionally comprises partially or entirely raising said telescopic tower.

In another preferred embodiment of the invention, the step of installing the auxiliary floating system around the offshore structure is done at the port (also able to be done in a bay, estuary or any inshore zone close to the coast that provides a greater level of protection than on the open sea or offshore).

In another preferred embodiment of the method of the invention, the auxiliary floating system has a foldable modular structure wherein, after removing the auxiliary floating system from the offshore structure, said auxiliary floating system is arranged in a folded configuration.

In another preferred embodiment of the invention, the offshore structure is self-supporting in an incomplete situation, while the complete offshore structure is only self-supporting together with the auxiliary floating system.

Lastly, and by way of example, other objects of the present invention are, in a non-limiting manner, related to wind turbine foundations, wind turbine towers or wind turbines installed or transported by means of a method according to the embodiments herein described.

As mentioned in the preceding paragraphs, the invention makes it so the dependency on the costly use of specific anchoring ships for installing the offshore structures is no longer necessary, thereby overcoming the bottleneck involved and achieving greater ease, cheaper costs and freedom of operation in the transport and installation of the assembly.

Moreover, the system and method described in the present invention suitably increase the stability of the assembly during the installation processes but unlike the previously described inventions of the state of the art, they allow for the free vertical sliding of the foundation and/or wind turbine tower against the auxiliary floating system, facilitating the installation thereof and allowing for the ballasting and anchoring of the same, maintaining and/or increasing the stability of the assembly until it is completely installed.

BRIEF DESCRIPTION OF THE DRAWINGS

The previous characteristics, in addition to others, shall be understood more fully in light of the detailed description of exemplary embodiments, as well as by the preferred embodiments related to the drawings attached, wherein.

LIST OF REFERENCE NUMBERS OF THE FIGURES (1) Auxiliary floating system.
(2) Offshore structure.
(3) Foundation.
(4) Shaft.
(5) Floating elements.
(6) Sea level.
(7) Coupling structure.
(8) Locking ring of the coupling structure
(9) Guide elements.
(10) Opening and closing subsystem
(11) Actuators for folding or unfolding the system.
(12) Fenders.
(13) Support elements.
(14) Mobile closing elements.
(15) Articulations.
(16, 17) Cooperative closing elements.
(18, 18', 18") Fitting guides.
(19) Guide arms.
(20) Bolts.
(21) Bolted joints of approximation.
(22, 22', 22") Telescopic modules.
(24) Seabed.
(25) Compartments.
(26) Hydrodynamic damping plates
(26') Gates for regulating the ballasting of the floating elements.
(27) Upper level for the arrangement of guide elements.
(28) Lower level for the arrangement of guide elements.
(29) Depth.
(30) Freeboard.

DETAILED DESCRIPTION

A detailed description of the invention related to different preferred embodiments of the same is provided below, based on FIGS. 1-12 of the present document. Said description is provided for non-liming illustrative purposes of the invention claimed.

Figure 1:
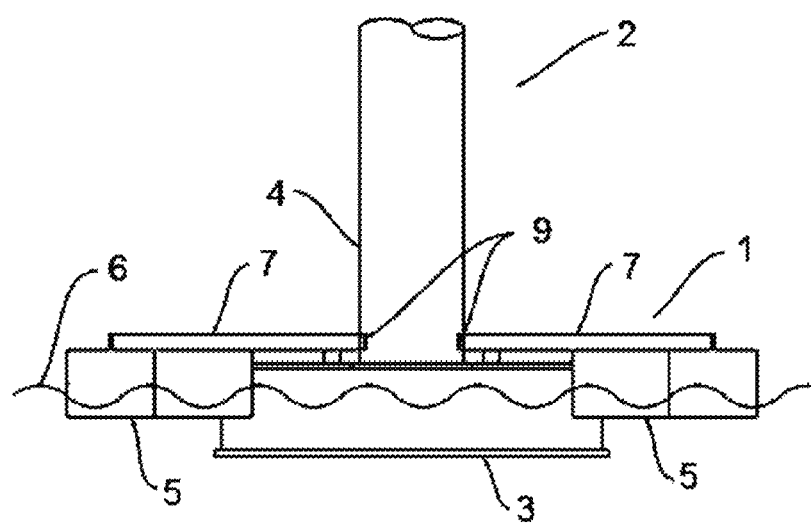
FIG. 1 shows a general view of the auxiliary floating system together with an offshore structure to be installed in a provisional situation.

FIG. 1 shows a general profile view of the auxiliary floating system (1) of the invention, together with an offshore structure (2), which in this case comprises a foundation (3) and a tower or shaft (4). In this embodiment, the auxiliary floating system (1) comprises at least a floating element (5) (specifically, in the example of FIG. 1, two of said elements (5) are shown.) The auxiliary floating system (1) is coupled to the offshore structure (2) during the installation, the laying of the foundation, the anchoring or transport of the same. In the embodiment shown, a provisional phase of the installation process of the offshore structure (2) is shown, wherein the same is afloat and partially submerged below the sea level (6).

The floating elements (5) of the system (1) are connected to a coupling structure (7) which, preferably, is intended to surround the offshore structure (2), being arranged around the shaft (4) such that the points or regions of contact with the coupling structure (7) serve as a stabilization guide for the offshore structure (2), helping the same to maintain its verticality during the previously mentioned operations. The coupling structure (7) preferably forms a locking ring (8) (see, for example, the view shown in FIG. 2a or FIG. 2h) around the shaft (4), which can be in a circular form, or have any other closed, curved or polygonal geometry.

In relation to the points or regions of contact between the coupling structure (7) and the offshore structure (2), the system of the invention is equipped with guide elements (9), at least one, secured to said coupling structure (7) and which can be arranged, preferably, along the locking ring (8). The guide elements are in free sliding contact with the shaft (4) and, advantageously, allow for relative, vertical movement between said shaft (4) and the auxiliary floating system (1). This way, the coupling structure (7) provides a physical stop against variations in the position of verticality of the offshore structure (2), limiting the possible tilt that the same may experience (for example, due to the wind, swell, etc.) and helping said structure (2) maintain its stability, but by means of sliding contacts that allow for the free movement along a substantially vertical axis, which is a fundamental advantage in the operations of anchoring or ballasting the offshore structure (2) when the same is in the final location. The aforementioned free movement of the offshore structure (2) can be carried out by sliding, rolling, caterpillar tracks, or any known technique which allows for independent relative movement and which is sufficiently free between the guide elements (9) on the surface of the shaft (4).

The guide elements (9) prevent and/or limit other relative movements between the auxiliary floating system (1) and the shaft (4), either by relative horizontal movement (preferably being equal to or less than 1 m), the relative rotation in the roll and/or pitch (preferably equal to or less than 10 degrees) and the relative rotation in the yaw (preferably less than 20 degrees).

The guide elements (9) prevent and/or limit other relative movements between the auxiliary floating system (1) and the shaft (4), either by relative horizontal movement (preferably being equal to or less than 1 m), the relative rotation in the rock and/or pitch (preferably equal to or less than 10 degrees) and the relative rotation in the yaw (preferably less than 20 degrees).

As was previously described, in the embodiment of FIG. 1, the offshore structure (2) comprises a foundation platform (3), and a shaft (4) with a plan dimension less than that of said foundation. In the provisional situation of tugboat transport, the foundation (3) is preferably semi-submerged and the shaft (4) is completely emerged. The floating elements (5), also semi-submerged, are positioned at a sufficient distance from the axis of the shaft (4) so as not to hit the foundation (3) while it remains semi-submerged. The coupling structure (7) thus remains connected to the floating elements (5), emerged, and floating above the semi-submerged foundation (3), and in this way it does not interfere in the coupling of the auxiliary floating system (1) to the shaft (4).

In the embodiment of FIG. 1, one can see that the auxiliary floating system (1) contributes to the stability of the offshore structure (2), but does not contribute to the buoyancy thereof, given that, as was previously explained, the relative vertical movement between the system (1) and the structure (2) is freed, and therefore the system (1) does not transmit any vertical force to the structure (2), which contributes in a relevant way to the buoyancy thereof. Therefore, said offshore structure (2) will mainly be a self-floating structure or have positive buoyancy, in other words it will not depend on the vertical forces that can be applied by the auxiliary floating system (1) in order to have said buoyancy. Put another way, in the absence of the floating system (1), the offshore floating structure (2) would have a reduced stability, but would not experience relevant changes to the floating depth thereof. Therefore, unlike other solutions in the prior art, the present invention does not require a connection in a vertical direction between the auxiliary means and the offshore structure to be installed, which provides a great operative advantage.

Optionally, in the system (1) of the invention, it is also possible to use securing means to prevent or limit relative vertical movement between the offshore structure (2) and the guide elements (9), such as rigid bars, cables of variable length or that are fixed, or other connection and/or securing means known in the art. However, these securing means are preferably provisional and the use thereof is limited, in all cases, to only one or some phases of the installation process, such as the tugboat transport of the assembly formed by said offshore structure (2) and the system (1).

FIGS. 2a-2e show an upper view of the different positions of the coupling structure (7) in a preferred embodiment of an auxiliary floating system (1) according to the present invention. Said embodiment shows a configuration based on three floating elements (5) connected to the coupling structure (7) and a plurality of guide elements (9) secured to the coupling structure (7) that make up a stabilization perimeter to house and couple to the offshore structure (2) (shown in FIGS. 2f-2h), surrounding the shaft (4) of said structure (2).

The coupling structure (7) according to this preferred embodiment also acts as a joining structure for the different floating elements (5). By way of example, but without limiting the invention thereto, the coupling structure (7) is made up of a lattice metal structure, as shown in FIGS. 2a-2h. Moreover, said coupling structure (7) comprises an opening and/or closing subsystem (10) to facilitate the placement and/or removal of the offshore structure (2) and, optionally, one or more actuators (11) for the folding and/or unfolding of the system (1), intended to apply the necessary forces between the different floating elements (5) of the system (1) to go from a folded configuration to an unfolded configuration (meaning in the coupling position with the offshore structure (2) and/or vice versa). Said actuators (11) may or may not have remote actuation. In the preferred embodiment of FIGS. 2a-2e, the actuators comprise telescopic, hydraulic cylinders, able to exert force by extending or retracting. Alternatively, said actuators (11) can comprise different types of means known in the art, such as mechanic, pneumatic or hydraulic actuators, cable actuated by means of winches or similar.

As was previously mentioned, the coupling structure (7) is preferably modular or adjustable in order to be able to adapt to offshore structures (2) and/or shafts (4) of different dimensions and/or characteristics. For example, a module can be added or subtracted from the lattice arms of the coupling structure (7) in order to adjust the length thereof and, therefore, the distance thereof to the shaft (4). Alternatively, or complementarily, the position and/or dimension of the guide elements (9) can be changed or regulated, such that the same auxiliary floating system (1) can be used to install offshore structures (2) with shafts (4) of different diameters, or shafts (4) with a variable diameter.

Figure 2A:
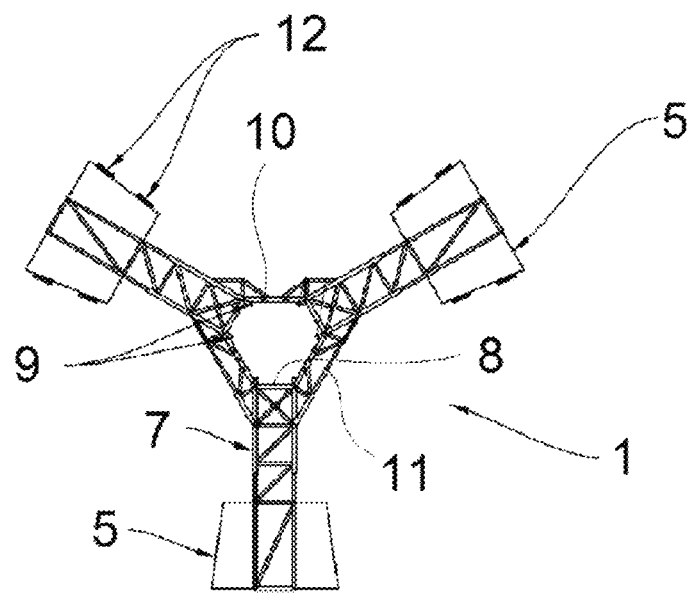
FIGS. 2a-2h show different embodiments of the auxiliary floating system of the invention and different stages of the method of the unfolding and folding thereof.
Figure 2B:
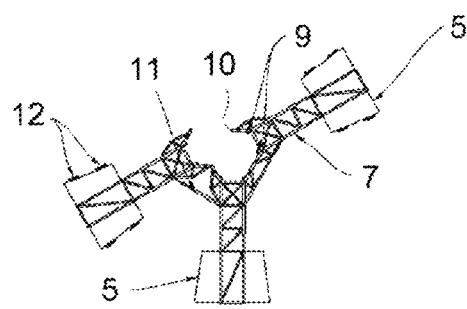
Figure 2C:
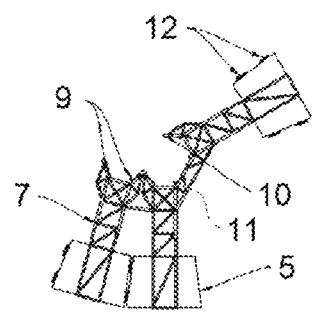
Figure 2D:
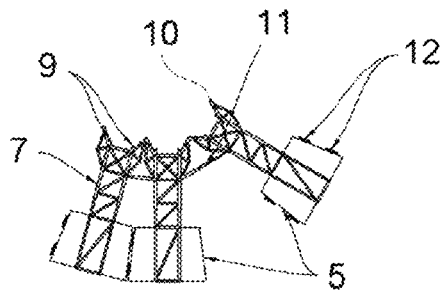
Figure 2E:
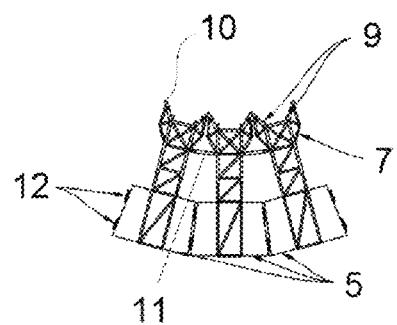
Figure 2F:
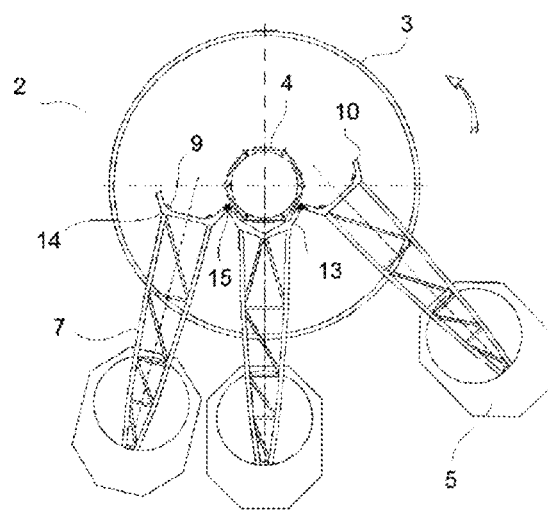
Figure 2G:
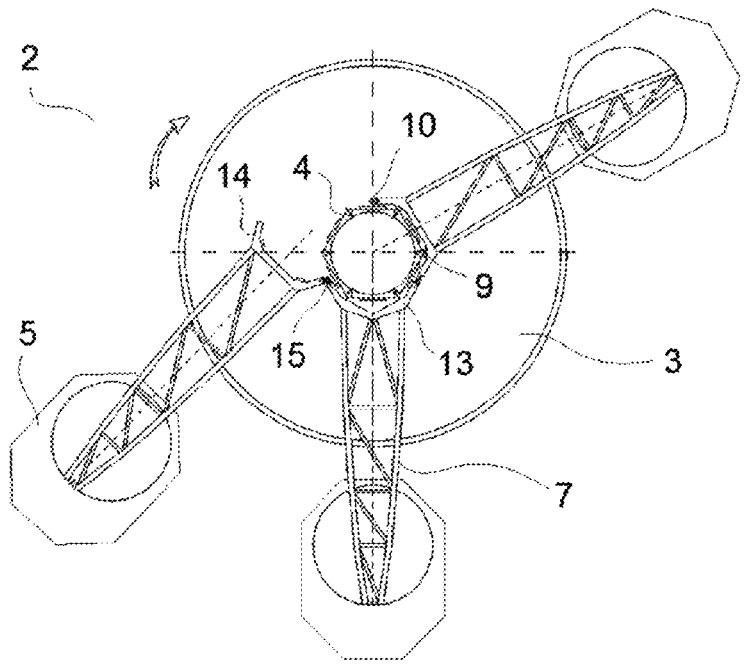
Figure 2H:
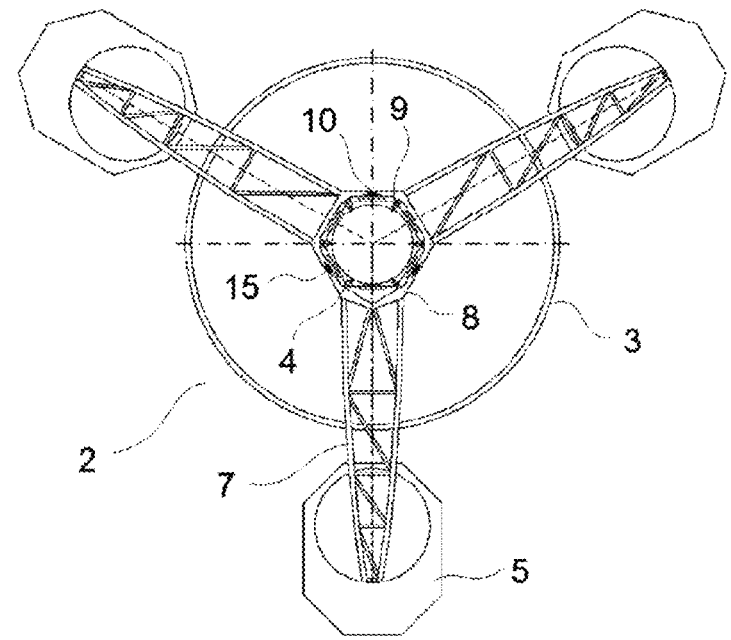
Figure 3A:
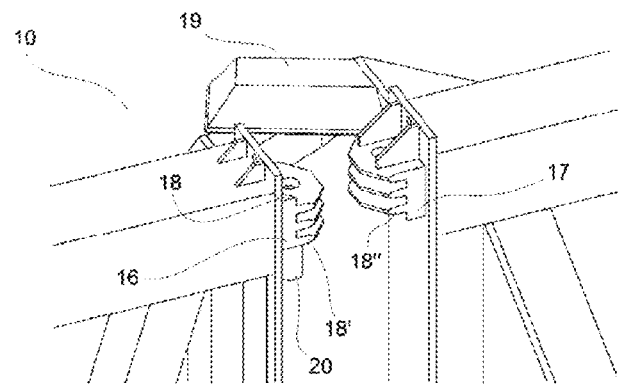
FIGS. 3a-3d show different views of an embodiment of the opening and closing subsystem of the system of the invention.
Figure 3B:
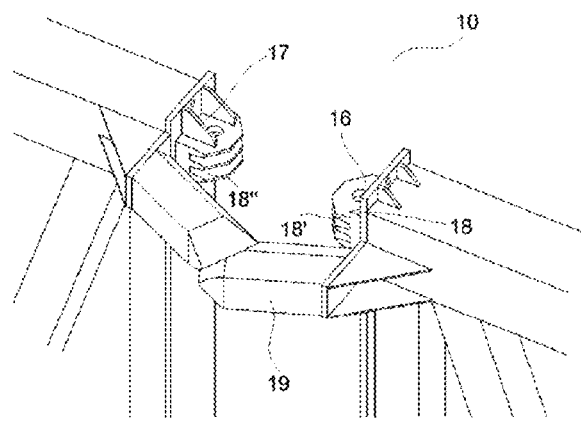
Figure 3C:
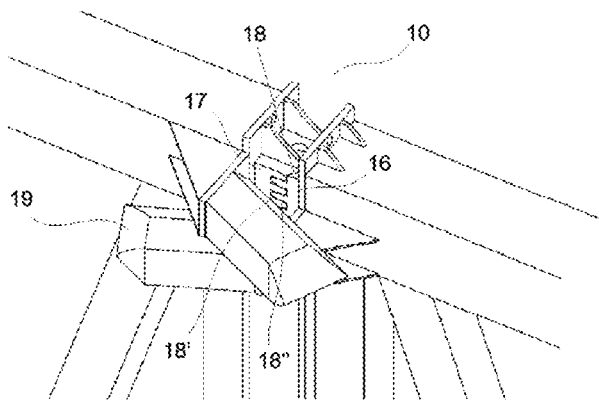
Figure 3D:
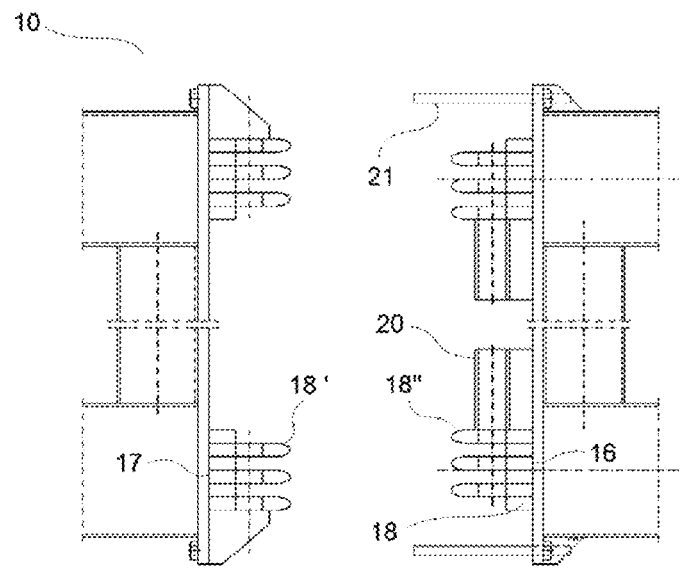

FIG. 2a shows the auxiliary floating system (1) in the extended configuration thereof, unfolded and closed, just as it would act during the transport and/or installation of the offshore structure (2) (see, for example, FIGS. 2f-2h). In turn, FIGS. 2b-2d show different steps of the folding method of said auxiliary floating system (1), wherein an articulated coupling structure (7) is shown, which allows a folded configuration to be adopted thereby enabling the coupling to and uncoupling from the shaft (4), facilitating the transport and/or collection thereof when it is not in operation. Additionally, FIG. 2e shows the auxiliary floating system (1) in the folded configuration thereof, which can for example, be used for the transport the same to the port once the installation of said offshore structure (2) is finished. In a complementary way, for this embodiment or other preferred embodiments of the invention, the floating elements (5) can also comprise a plurality of fenders (12) which are used to prevent impacts between said elements (5) during the transport and/or in the folded configuration thereof.

As shown in FIGS. 2a-2e, the option of the coupling structure (7) being modular and/or adjustable allows the system to adapt to foundations (3) and/or shafts (4) of different dimensions or characteristics, thereby providing an advantage of additional application when compared to other systems of the state of the art. In this example, the auxiliary floating system (1) comprises three floating elements (5), and the coupling structure (7) comprises three lattice arms, each one joined by one end to each floating element (5). This way, three modules or sub-assemblies are formed, each one made up of a floating element (5) and an arm of the coupling structure (7), which are joined to one another. Preferably, each arm and floating element (5) assembly is self-balancing, in other words, each one of the sub-assemblies can float independently, maintaining the lattice arm in an essentially horizontal position. To do so, the floating element (5) can have an eccentric top slab, and/or an eccentric ballast as a counterweight, thereby compensating for the eccentricity of the lattice. Thanks to the previously explained points, when the auxiliary floating system (1) opens or closes to couple to or uncouple from the offshore structure (2), the coupling structure (7) is essentially maintained on the same horizontal plane.

Additionally, FIGS. 2f-2h show different phases of the coupling process of the system (1) of the invention to an offshore structure (2) that comprises a shaft (4) and a foundation (3). During said process, the modular coupling structure (7) comprises a support element (13) on the tower shaft (4), and one or more mobile elements (14) that close on said shaft (4).

To this end, the mobile elements (14) comprise a part or all of the components of the closing subsystem (10), which allows for the complete coupling structure (7) to close on the offshore structure (2), carrying out, for example, the following steps:

- The floating system (1) in a folded configuration is moved in close until the support element (13) makes contact with the offshore structure (2), FIG. 2f.
- One or more means for maintaining the position are applied (for example, a tugboat or system of cables or winches) such that contact between the support element (13) and the offshore structure (2) is maintained throughout the coupling process.
- The mobile elements (14) of the coupling structure (7) are moved until the same completely surround the shaft (4) of the offshore structure, FIG. 2g.
- Action is performed on the closing subsystem (10) of the coupling structure, in order to secure the auxiliary floating system (1) in the folded or coupled configuration thereof (FIG. 2h).

Likewise, as shown in FIGS. 2f-2h, the opening and/or closing subsystem (10) can comprise one or more articulations (15) that allow for an essentially horizontal rotation of a floating element (5) of the coupling structure (7) with respect to another floating element (5).

The arrangement of floating elements (5) according to the embodiment shown in FIGS. 2a-2h further has the advantage in that said elements (5) do not overlap, in the plan distribution thereof, with the plan distribution of the offshore structure (2) when the opening and/or closing subsystem (10) is closed on said offshore structure (2). In the example of the aforementioned figures, one can see how the plan position of the foundation (3) of the offshore structure (2) does not coincide with the corresponding position of the floating elements (5), regardless of the floating position said foundation (3) has. This provides great flexibility to the floating system (1) to adequately adapt to the different phases of the operations of transport, installation or maintenance of the offshore structure (2), which generally produce different anchoring levels (and which include, for example, both an emerged position of the foundation (3) of the offshore structure (2) and a submerged position of the same).

On the other hand, and as shown by FIGS. 3a-3d, the opening and/or closing subsystem (10) of the auxiliary floating system (1) has at least two cooperative closing elements (16, 17), optionally equipped with a plurality of fitting guides (18, 18', 18") intended to facilitate an appropriate orientation of the floating elements (5) of the coupling structure (7) during the closing operation of the floating system (1) on the offshore structure (2). The fitting guides (18, 18', 18") are advantageous for adapting the position of the coupling structure (7) in the presence of perturbations caused by the uneven levels of the sea level (6), (for example, due to the swell). Preferably, the fitting guides (18, 18', 18") are adapted to provide an orientation both on the surface (for example by means of pointing wedges (18) (shown in FIGS. 3a-3d) and in height (for example, by means of aiming teeth (18', 18") for the connection of the cooperative closing elements (15, 16), or by means of guide arms (19) to provide alignment of the end modules of the coupling structure (7) that comprise said elements (15, 16).

In addition to the previously described components, in the opening/closing subsystem (10), it is possible to include one or more additional closing means, such as joints by means of bolts (20), bolted joints of approximation (21) or other means such as magnets, electromechanical locks, etc. are also able to be used in the sphere of the invention.

Optionally, the auxiliary floating system (1) can additionally comprise at least a longitudinal element secured by one of the ends thereof to the offshore structure (2) and by the other end thereof to said auxiliary floating system (1), the length of said longitudinal element being adjustable such that said connection can be maintained while the offshore structure (2) sinks, the relative position thereof varying with respect to the auxiliary floating system (1), which is maintained essentially at the same floating level on the surface.

Figure 4:
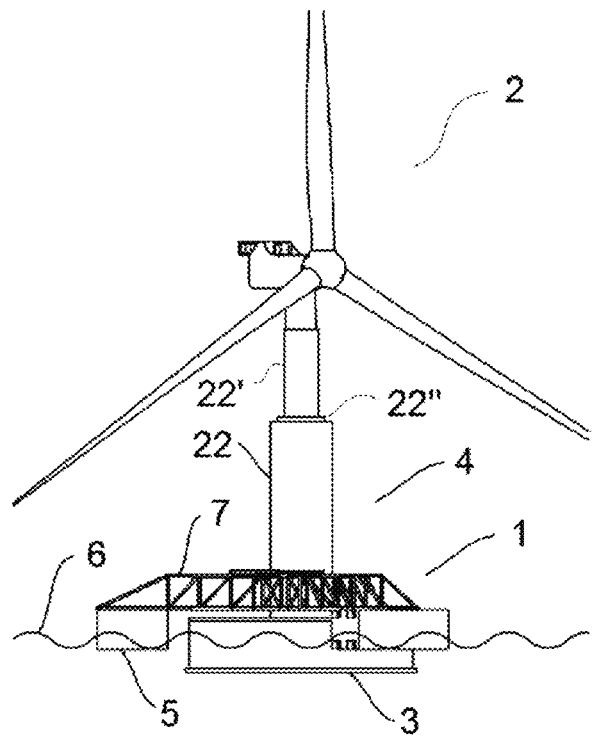
FIG. 4 shows an embodiment of the system of the invention, applied to a telescopic wind turbine tower.

As an additional example of the invention, FIG. 4 represents a preferred embodiment wherein the offshore structure (2) to be installed comprises a telescopic offshore wind turbine tower formed by said telescopic modules (22, 22', 22") with a circular plan. In said embodiment, one can observe that the foundation (3) is semi-submerged during the transport thereof and the shaft (4) acts as a module or base section of said telescopic wind turbine tower.

Figure 5:
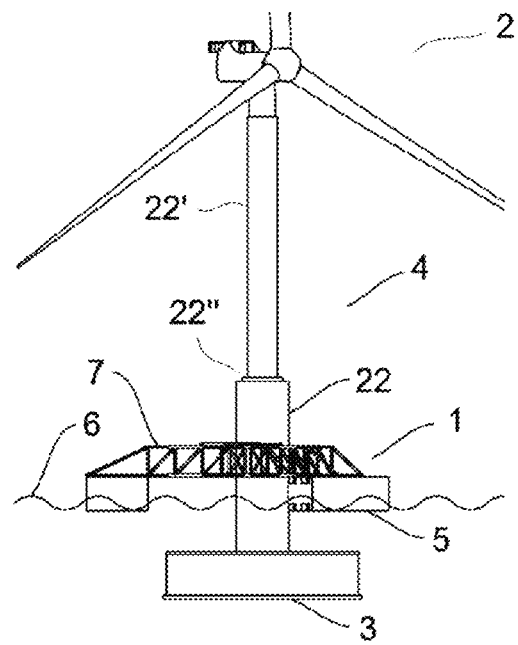
FIG. 5 shows an embodiment of the invention with the wind turbine tower partially anchored and with a section of the tower raised.

On the other hand, and for the same embodiment, FIG. 5 illustrates part of the method for the installation of the foundation (3) of said tower shaft (4), said foundation (3) being based on gravity and/or provisionally or definitively floating, wherein said shaft (4) is essentially vertical and can form part of the foundation itself (3) as well as of the wind turbine tower located on the same, and which uses the auxiliary floating system (1) of the invention to said end. As can be seen in FIG. 4, the aforementioned method comprises the partial anchoring of the offshore structure (2) to thereby improve the conditions of the transport thereof. Furthermore, said method can additionally comprise the step of partially or totally raising the telescopic tower.

Figure 6:
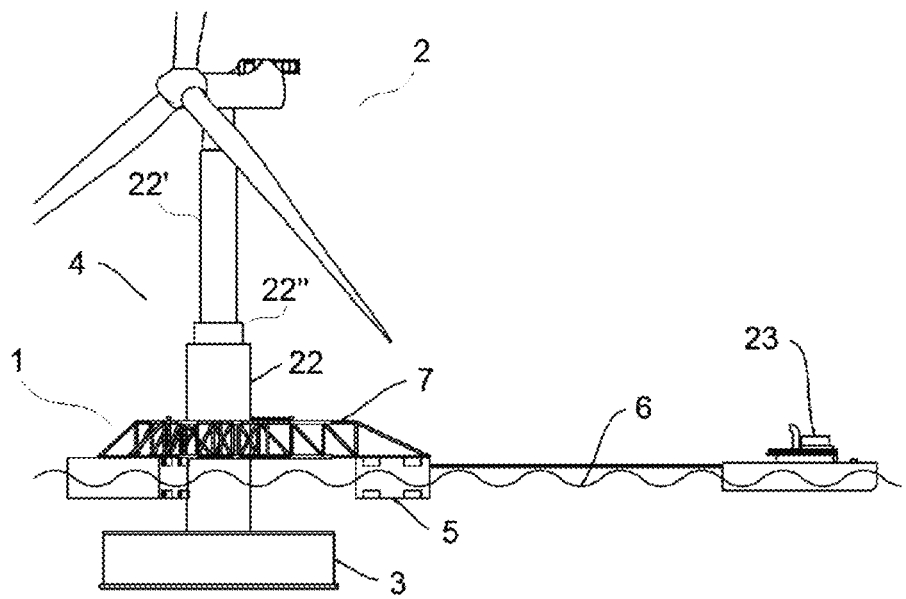
FIG. 6 shows a stage of the installation method with the auxiliary floating system by means of a tugboat.

FIG. 6 shows another stage of the method for the installation of the foundations (3) and/or offshore wind turbine towers, wherein one or more tugboats (23) are used to pull the auxiliary floating system (1) during the transport of the assembly to the final location thereof, and/or during the anchoring of the offshore structure (2) to the definitive situation thereof. In said figure, one may also observe that the offshore structure (2) is partially anchored during the transportation thereof and the telescopic tower is partially raised.

Figure 7:
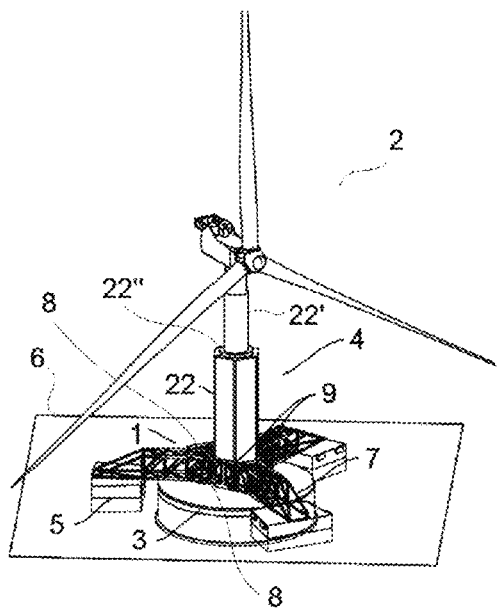
FIG. 7 shows an embodiment of the invention with a wind turbine tower with at least a polygonal section.

FIG. 7 represents another preferred embodiment of the invention, wherein the offshore structure (2) to be installed comprises a shaft (4) with a polygonal section, such that it facilitates the installation of the auxiliary floating system (1), limiting or preventing the rotation capability of said offshore structure (2) with respect to the guide elements (9). In said embodiment the coupling structure (7) is formed by a lattice and comprises two rings (8) that surround the shaft (4) at two different heights, coinciding with the lower part and the upper part of said lattice. The guide elements (9) are distributed on the perimeter of both rings (8), thus being situated on two different levels and improving the efficiency of the system for limiting relative inclinations between the system (1) and the shaft (4) while at the same time reducing the fundamentally horizontal forces, which to said end are mutually transmitted through the guide elements (9).

Figure 8A:
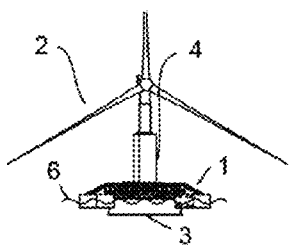
FIGS. 8a-8e show a method for the installation of foundations and/or offshore wind turbine towers according to the present invention.
Figure 8B:
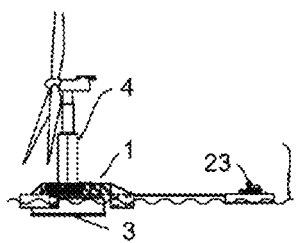

FIGS. 8a-8e show a method for the installation of foundations (3) and/or shafts (4) of offshore wind turbine towers that use an auxiliary floating system (1) according to the present invention. In this case it is a foundation (3) based on gravity, which, in an installed condition, is supported on the seabed. FIG. 8a shows the offshore structure assembly (2) together with the auxiliary floating system (1) already installed on the same. FIG. 8b represents another step of said method, specifically the step of transporting said offshore structure assembly (2) and the auxiliary floating system (1) to its final location, using one or more tugboats (23) to do so. However, in the context of the invention, other similar dragging or pushing means are likewise usable.

Figure 8C:
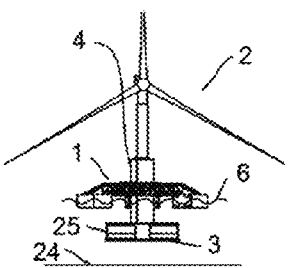

FIG. 8c illustrates another phase of the method of installing foundations (100) and/or shafts (4) of offshore wind turbine towers, specifically the step of anchoring the offshore structure (2) at the definitive situation thereof on the seabed (24). In this embodiment one can see that the offshore structure (2) comprises several compartments (25) that form part of the foundation (3), wherein a differential control is carried out of the filling to facilitate the control of the inclinations of the assembly. Preferably, in said anchoring phase, three or more tugboats (not shown in FIG. 8c) are used, which act on the system (1) in order to maintain the plan position of the assembly.

Figure 8D:
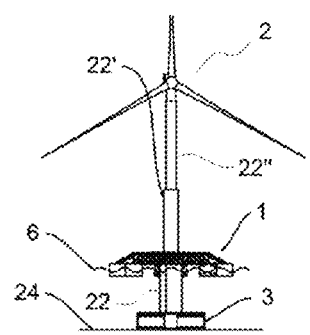
Figure 8E:
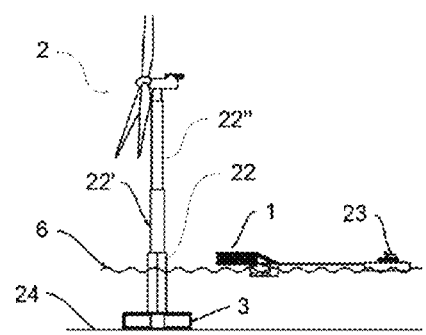

FIG. 8d shows another phase of the method, wherein the foundation (3) of the offshore structure (2) already rests on the seabed (24). FIG. 8e shows the offshore structure (2) in the definitive situation thereof, and uncoupled from the system of the invention. In this case, said offshore structure (2) comprises a telescopic tower (22, 22', 22") that has already been completely raised. The figure likewise shows how the floating system (1) of the invention is separated from the offshore structure (2) and arranged in a folded configuration in order to facilitate the transport thereof. As was previously mentioned, the articulable and modular capability of the system (1) of the invention allows for the adaption thereof to multiple types of marine structures (2), making it so they are recoverable and/or reusable for subsequent installations or transport.

In FIGS. 8a-8e one can see how throughout the installation process of the offshore structures (2) the auxiliary floating system (1) remains semi-submerged and afloat essentially at the same surface level, while the level of the offshore structure (2) varies as it sinks until resting against the sea bed (24), with an essentially free relative vertical movement existing between both self-floating bodies.

Likewise, in the embodiment of FIGS. 8a-8e, the shaft (4) has a constant diameter, which facilitates the guiding operation, and the length thereof is such that the upper part of the same is emerged in an installed condition, such that the level of the top elevation of said shaft (4) is higher than the level at which at least part of the guide elements (9) comprised in the system are situated.

Figure 9:
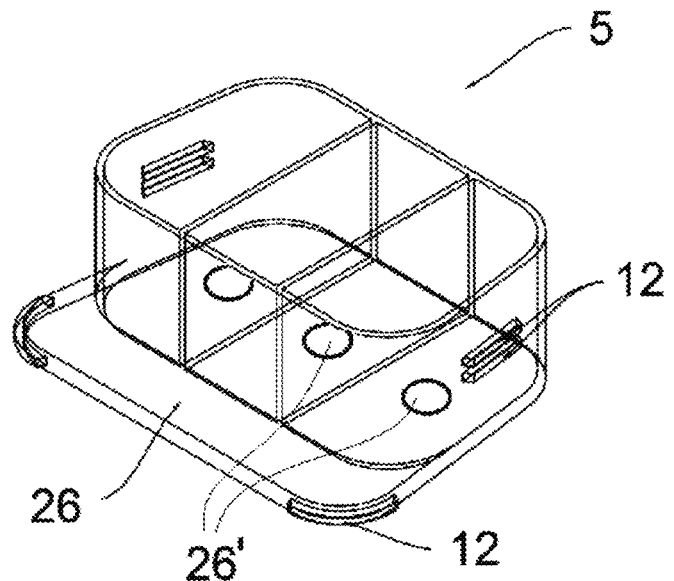
FIG. 9 shows a possible embodiment of the floating element comprised in the auxiliary floating system object of the present invention.

FIG. 9 of the present document shows a possible specific embodiment of the floating element (5) of the auxiliary system (1) of the invention. In it, said floating element (5) comprises hydrodynamic damping plates (26), such as the heavy plate type, for example, to reduce and damp undesired movements. Likewise, the aforementioned floating elements (5) of the system (1) can be ballasted, in order to provide an additional means of control for the buoyancy thereof, and also for the stability of the offshore structure (2). Likewise, the floating element (5) can comprise one or more lower gates (26') for regulating the ballast on the base of said floating element (5), situated in the underwater area (the part of the floating body that is submerged, in contact with the water) to allow and/or control the flow of water between the inside of said floating element (5) and the body of water in which it floats, as a means for adjusting the behavior, damping and natural frequency of the assembly. Said gates (26') preferably have an adjustable opening and/or remote actuation.

The opening of the regulating gates (26') allow the level of the filling and/or of the inlet/outlet of the water of the floating elements (5) of the system to be established, which in practice is equivalent to regulating the effective area of buoyancy of the same. It is therefore possible to indirectly control the period of oscillation of said floating elements (5) and/or of the assembly they form with the offshore structure (2) in the different stages of the operations of transportation, installation or maintenance of the marine structure (2).

This way, the methods associated with the aforementioned operations can optionally include, a first stage wherein at least one of said gates is totally or partially open, which is equivalent to reducing the effective area of the floating element (5) that comprises it, and a second stage wherein said gate (26') closes with respect to the position of the first stage, which is equivalent to increasing the effective area of the floating element (5). Furthermore, the regulating gates (26') can be used to regulate the ballast level of the floating element (5). Preferably, in offshore structures (2) comprising a foundation (3), the regulating gates (26') are totally or partially open in phases in which the foundation (3) is in an emerged position. Likewise, when said foundation (3) is in a submerged position, the adjustable gates (26') are closed (or at least more closed than in the emerged position of the foundation (3)).

In turn, the floating element (5) can be manufacture using different materials known in the art, preferably concrete and/or metal materials. A mixed construction can also be used, manufacturing an inner part of concrete and the rest of the floating element (5) of steel. Techniques using precast concrete similar to those commonly used for the construction of precast containers can also be used.

The configuration of floating elements (5) can also be modular, to be able to adjust the global size thereof. The pieces or modules that can be used to form said floating elements (5) can be different forms, the dimensions thereof preferably being suitable for containerization (no greater than those of a standard container) in order to facilitate the transport and reused thereof. Said modules can be joined to one another to make up a floating element (5) both at the base as well as above.

Preferably, the assembly formed by the floating elements (5) and the coupling structure (7) that couples to the offshore structure (2) is hydrodynamically self-stabilizing, in such a way that the distribution of mass of said floating elements (5) and of the coupling structure (7), and the corresponding floating center, is such that the floating elements (5) are balanced in an erected position when the opening and/or closing subsystem (10) is open (that is, with the uncoupling system (1) of the offshore structure (2)). In practice, this implies that, even when the subsystem (10) is open, the assembly of elements on each side of the articulations (15) will adopt a position with a depth, pitch and tilt essentially equal to those of the closed subsystem (10).

Figure 10:
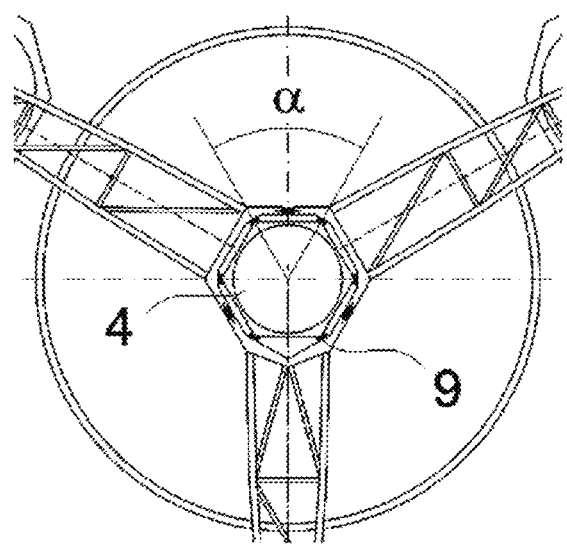
FIG. 10 shows different aspects of the arrangement of the guide elements of the coupling structure around a tower shaft, wherein the maximum plan angle formed by a contiguous pair of said guide elements and the central axis of the shaft is shown.
Figure 11:
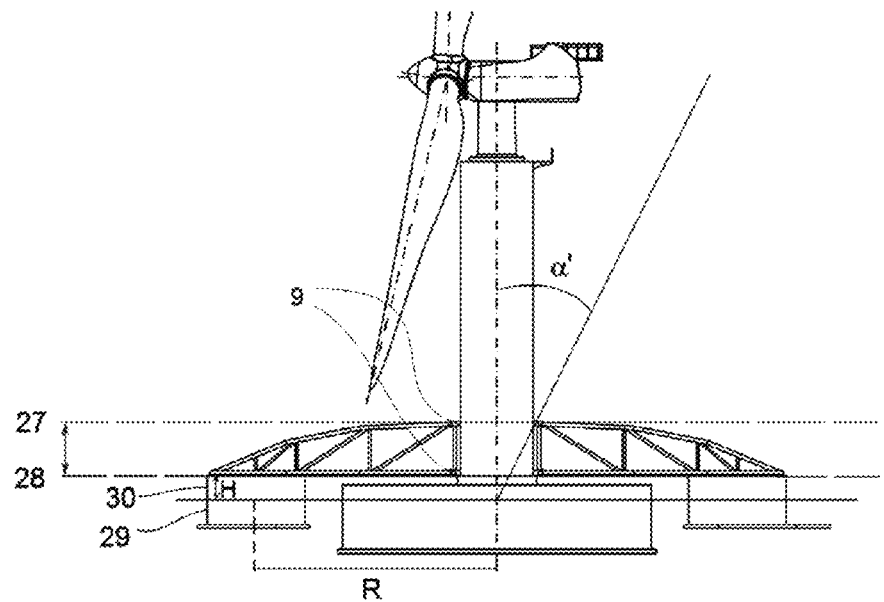
FIG. 11 shows a configuration of the guide elements of the coupling structure at two different height levels, indicating the difference in the level between the highest level and the lowest level, as well as the depth and the freeboard of the floating elements.

In relation to the geometric relationships of the elements of the auxiliary floating system (1) of the invention, FIGS. 10 and 11 show different aspects of the same that are provided for illustrative purposes. FIG. 10 shows how the guide elements (9) have a plan arrangement around the shaft (4), such that the maximum plan angle ($\alpha$) formed by any pair of said guide elements (9) and the central axis of the shaft (4) is equal to or less than three radians. In turn, FIG. 11 shows guide elements (9), the elevation arrangement of which takes place on at least two levels, the difference in level between the highest level (27) and the lowest level (28) of said levels being equal to or greater than 1 m. Likewise, FIG. 11 also shows an embodiment of the auxiliary floating system (1), wherein the floating elements (5) comprise a depth (29) and a freeboard (30) that is equal to or greater than a given length (H), the value of which essentially complies with the equation $H = R \cdot \sin(\alpha')$, (R) being the distance from the center of each floating element to the longitudinal axis of the shaft (4), and ($\alpha'$) being the maximum angle of inclination of the foundation (3) of the offshore structure (2) allowed during the installation and/or transport thereof.

Figure 12:
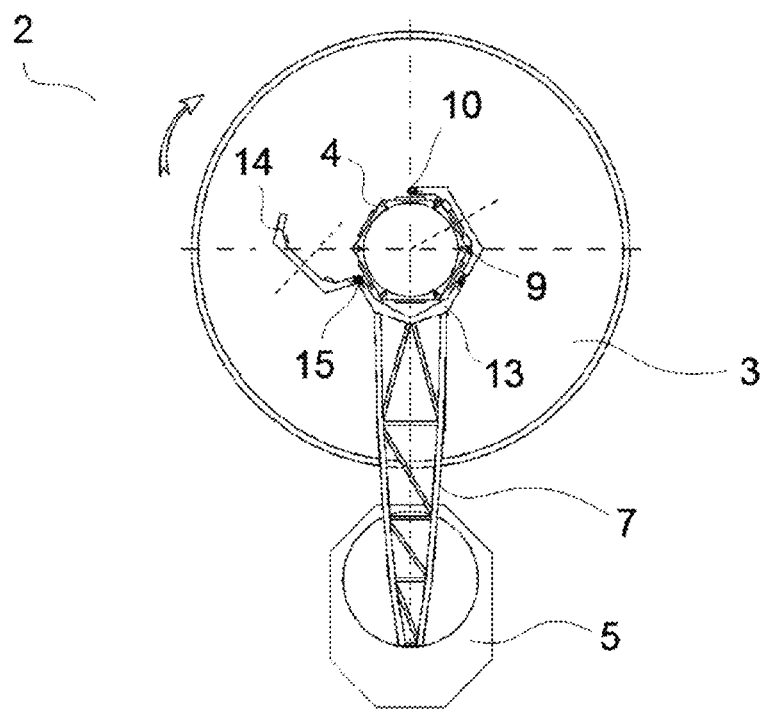
FIG. 12 shows a preferred embodiment of the invention especially indicated for maintenance operations of an offshore structure, wherein the auxiliary floating system comprises a single floating element.

Lastly, FIG. 12 shows an embodiment of the invention based on a single floating element (5) connected to a coupling structure (7) intended to be secured to the offshore structure (2). Said embodiment of the system is especially indicated in maintenance operations of said structure (2), wherein, for example, the transport of the same is not necessary. As can be seen in FIG. 12, the aforementioned maintenance operations will typically comprise the transport of the auxiliary floating system (1) to the location of the offshore structure (2) and the securing of the same by means of the operation of the opening and closing subsystem (10) of the coupling structure (7). In these types of applications of the invention, the floating element (5) and/or the coupling structure (7) can be equipped with auxiliary operation or maintenance means, such as an elevation crane, suitable for transferring equipment to or from the marine structure (2) and to or from the floating system (1) or to and from an auxiliary vessel.

Preferably, land cranes will be able to be used, which are more economic than the offshore cranes, which is possible thanks to the fact that the coupling of the floating system (1) to the offshore structure (2) limits the movements of the former and facilitates the operation of the crane, even for work at tall heights, as is the case for example in the maintenance operations for wind turbines.

What is claimed is:

1. An auxiliary floating system for the installation and/or transport of an offshore marine structure, said offshore structure being provisionally or definitively self-floating and comprising an essentially vertical shaft, wherein said auxiliary floating system further comprises:
   one or more floating elements;
   at least a coupling structure connected to said floating elements and configured to couple to the offshore marine structure around the vertical shaft thereof, wherein said coupling structure comprises an opening and closing subsystem to facilitate the placement on and/or removal thereof from the offshore marine structure, wherein the opening and closing subsystem comprises one or more articulations that allow for a horizontal rotation of the one or more floating elements about said articulations, with respect to an essentially vertical axis;
   one or more guide elements comprised in the coupling structure which provide one or more sliding contact surfaces with said vertical shaft; wherein the auxiliary floating system is configured such that, when the coupling structure is coupled to the offshore marine structure around the vertical shaft thereof:
      the coupling structure allows for essentially free relative vertical movement between the auxiliary floating system and the vertical shaft such that if the offshore marine structure sinks, the auxiliary floating system remains at essentially the same level on the surface; and
      the coupling structure limits and/or prevents other relative movements between the auxiliary floating system and the vertical shaft, both in the relative horizontal movement and in the relative rotation during roll, pitch or yaw.

2. The auxiliary floating system according to claim 1, which comprises a plurality of guide elements, and wherein said guide elements have a plan arrangement around the vertical shaft, such that the maximum plan angle ($\alpha$) formed by any guide element, the neighboring guide element and the central axis of the vertical shaft, is equal to or less than three radians.

3. The auxiliary floating system according to claim 1, which comprises a plurality of guide elements with an elevated arrangement on at least two levels, the level difference between the highest level and the lowest level of said levels being equal to or greater than 1 m.

4. The auxiliary floating system according to claim 1 for the use thereof in offshore marine structures, the vertical shaft which has a transverse cross section with an essentially polygonal outer geometry, and which comprises at least three guide elements in contact with said vertical shaft in the proximity of the vertices of said essentially polygonal geometry.

5. The auxiliary floating system according to claim 1, wherein the coupling structure comprises at least a ring adapted to surround the vertical shaft of the offshore marine structure.

6. The auxiliary floating system according to claim 1, which comprises two or more floating elements and wherein the coupling structure is a modular and/or articulated structure that connects at least two of said floating elements.

7. The auxiliary floating system according to claim 6, wherein the opening and/or closing subsystem comprises one or more articulations that allow for an essentially horizontal rotation of the floating element of the coupling structure with respect to another floating element.

8. The auxiliary floating system according to claim 6, wherein the opening and/or closing subsystem of the auxiliary floating system has at least two cooperative closing elements, optionally equipped with a plurality of fitting guides adapted to orient the position of the floating elements of the coupling structure during the closing operation of the floating system on the offshore structure.

9. The auxiliary floating system, according to claim 1, wherein the auxiliary floating system comprises at least a longitudinal element secured by one of the ends thereof to the offshore marine structure and by the other end thereof to said auxiliary floating system, the length of said longitudinal element being adjustable such that said connection can be maintained while the offshore marine structure sinks, the relative position thereof varying with respect to the auxiliary floating system which is maintained essentially at the same floating level on the surface.

10. The auxiliary floating system according to claim 1, wherein at least one floating element comprises a submergible hydrodynamic damping plate, said plate being essentially horizontal and flat.

11. The auxiliary floating system according to claim 1, wherein the plan distribution of the floating elements, when the opening and/or closing subsystem is closed on the offshore marine structure, is such that it does not overlap with the plan distribution of the offshore marine structure.

12. The auxiliary floating system according to claim 1, wherein the offshore marine structure comprises a foundation, and wherein at least one floating element of the system has a depth and a freeboard, both of which are equal to or greater than a given length (H), the value of which essentially complies with the equation $H=R\cdot\sin(\alpha')$, (R) being the distance from the center of each floating element to the longitudinal axis of the shaft, and ($\alpha'$) being the maximum angle of inclination of the foundation of the offshore marine structure allowed during the installation and/or transport thereof.

13. The auxiliary floating system according to claim 1, which comprises elevation means suitable for the placement and/or removal of equipment and/or personnel on or from the offshore marine structure.

14. A method for the installation and/or transport of an offshore marine structure, said offshore marine structure being of the type that has an essentially vertical shaft, wherein it comprises the use of an auxiliary floating system according to claim 1 and wherein the following steps are carried out in any possible order:
a) coupling the auxiliary floating system around the offshore marine structure;
b) anchoring the offshore marine structure to the definitive depth thereof while the auxiliary floating system is essentially kept at the same floating level on the surface; and
c) removing the auxiliary floating system from the offshore marine structure.

15. The method according to claim 14, which comprises the additional step of transporting the auxiliary floating system and/or the offshore structure to the final offshore location thereof, before or after step a).

16. The method according to claim 14, which additionally comprises connecting tugboats to the auxiliary floating system during one or more of the steps thereof.

17. The method according to claim 14 applied to an offshore marine structure made up of telescopic tower modules, which additionally comprises partially or entirely raising said modules during one or more steps thereof.

18. The method according to claim 14, wherein step a) is done in a protected coastal area before completing step b).

19. The method according to claim 14, wherein the offshore structure comprises a foundation; wherein one or more of the floating elements comprise one or more gates for regulating the ballasting on the base of said floating elements; and wherein the method comprises a first stage wherein the regulating gates are totally or partially open with the foundation situated in an emerged position; and a second stage wherein the regulating gates are completely closed, or more closed than in the first stage, with the foundation situated in a submerged position.

* * * * *